April 25, 1933.  F. A. GRITT  1,905,168
SIMULATION OF FAST MOVING OBJECTS
Filed Oct. 5, 1931
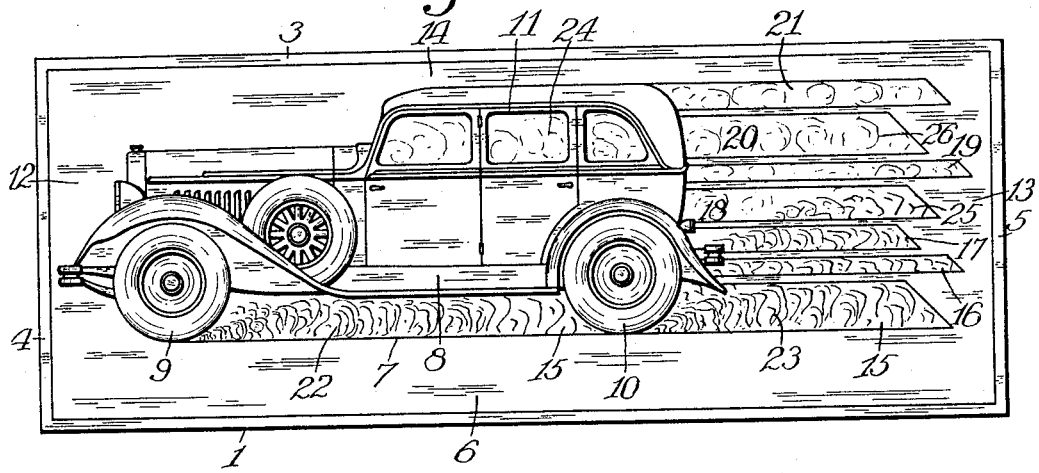
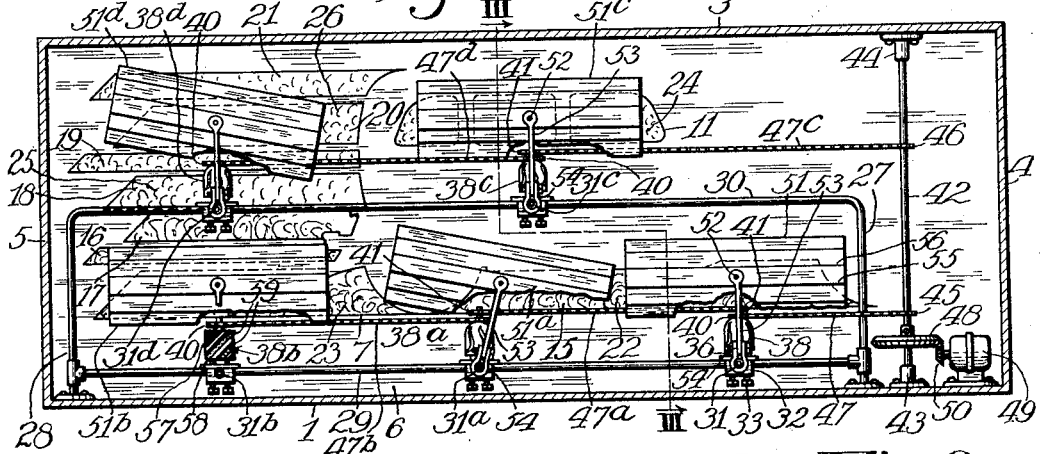
INVENTOR:
Frank A. Gritt,
BY
E. D. Silvius,
ATTORNEY.

Patented Apr. 25, 1933

1,905,168

UNITED STATES PATENT OFFICE

FRANK A. GRITT, OF INDIANAPOLIS, INDIANA, ASSIGNOR TO GRITT INCORPORATED, OF INDIANAPOLIS, INDIANA, A CORPORATION OF INDIANA

SIMULATION OF FAST-MOVING OBJECTS

Application filed October 5, 1931. Serial No. 567,022.

This invention relates generally to illuminated simulation of motion of objects and especially such objects as may be suitable for out-door bill-board advertising, and has reference more particularly to simulation of fast-moving objects such as automobiles or locomotives, speed boats and airplanes.

An object of the invention is to provide improved apparatus of such character as to be adapted to simulate fast-moving objects or to create an optical illusion that an object is moving in comparison with another object or objects.

Another object of the invention is to provide improved means for simulation of motion of objects of such type or character as to be suitable for luminous out-door advertising purposes.

A further object is to provide improved motion simulating apparatus which shall not be costly to manufacture and install but shall be adapted to be attractive as an advertising medium and likely to be generally instructive and amusing.

A still further object is to provide efficient apparatus for simulation of fast-moving objects which shall be of such construction as to be adapted for use as advertising medium and shall not be likely to suffer rapid deterioration, but shall be durable and economical in use.

With the above-mentioned and other objects in view, the invention consists in a billboard displaying an object represented as moving rapidly, and apparatus and other means for simulation of rapid movement of the object; the invention consisting also further in the features and in the parts and combinations and arrangements of parts as hereinafter particularly described and further defined in the appended claims.

Referring to the accompanying drawing,— Figure 1 is a front view of a display sign having a picture representing a vehicle as illustrative of a fast-moving object as a prominent feature of the invention; Fig. 2 is a vertical longitudinal section of the display sign structure on a plane adjacent to the back thereof and looking forward; Fig. 3 is a transverse section on the line III—III on Fig. 2; Fig. 4 is an elevation of one of the rotors or light-interrupters and structural features associated therewith, on an enlarged scale; Fig. 5 is a vertical section of the rotor illustrating its connection with an electric lamp and a shade or interceptor; and Fig. 6 is a detail view of structural features advantageously supporting the parts comprised in the simulation of motion apparatus.

Simlar reference characters in the different figures of the drawing indicate corresponding elements or features of construction herein referred to in detail.

A practical embodiment of the invention comprises a hollow bill-board structure which in one form has a frame comprising a bottom 1, a back part 2, a top part 3 and end walls 4 and 5, the frame supporting a display part which may be variously constructed as may be desired in the representation of the article required to be displayed.

For displaying a high speed or fast-moving object, such as an automobile for advertising purposes, as illustrated for example, the display part comprises an opaque panel 6 which extends from the frame bottom upward a suitable distance to a line 7 representing the top of a roadway above which the picture of an automobile is painted or suitably printed to illustrate a body 8 and wheels 9 and 10 which are on opaque portions of the display portion, the body having windows 11 represented on translucent portions of the display part. The entire display part may be composed of glass or other material and portions rendered opaque by means of suitable paint or similar coating thereon, leaving transparent portions or semitransparent portions which may be rendered translucent by means of stains or light-colored paint or tints. The display part has opaque field portions 12 and 13 forward and rearward of the vehicle and opaque upper field portions 14. Above the line 7 the display part has a translucent panel 15 appearing to extend from the front wheel 9 nearly to the frame part 5 to represent space below the body 8 and rearward of the rear wheel 10, there being translucent panels 16, 17, 18, 19, 20 and 21 in horizontal arrangement rearward of the automobile picture designed to give the impression to an observer of fanciful streaks left behind a fast-moving object. The lower translucent panel 15 has characters or figures 22 suggesting clouds of dust whirling behind the front wheel, other characters or figures 23 suggesting more dense clouds of dust or exhaust gases whirling behind the rear wheel 10. The translucent panel corresponding to the windows has faint representations of dust or vapor 24 to represent background seen through the windows on the translucent panels. Behind the vehicle picture appear characters or figures 25, 26 designed to represent rising and floating clouds of dust behind the vehicle to create the optical illusion the vehicle is rapidly moving forward. In some cases the translucent panels may be merely tinted appropriately and the characters thereon produced by means of simulating apparatus provided for the purpose and arranged behind the display part; or, the simulating apparatus may operate as complementary to faint artistic representations of vaporous or cloud-like matter floating rearward and upward behind the pictorial representation.

Improved mountings are provided for the motion simulating apparatus comprising as preferably constructed two posts 27 and 28 suitably spaced apart and secured upon the bottom member 1 of the bill-board frame, being arranged at a suitable distance from the front display part, the posts rigidly supporting the two rails 29 and 30 horizontally on different levels. The lower rail adjustably supports a plurality of arms 31, 31a, 31b, in horizontal arrangement, the upper rail similarly supporting a suitable number of arms 31c, 31d, each arm preferably being provided with a head member 32 adjustably fitted to the rail and provided with a set-screw 33 securing the member in place, all the arms extending rearward or towards the back board 2. Each arm head member has a lamp socket 34 supporting an electric lamp 35. Circuit wires, not shown, are conventionally connected with all the lamp sockets. Each lamp is provided with a shade 36 constituting a light-interceptor and secured to the head member 32 to prevent direct rays of light from passing to the front display part, particularly to the translucent portions thereof. Each shade has a center pin 37 fixed vertically to its top and a light-interrupter is rotatably supported on each center pin, so that there are a plurality of light-interrupters 38, 38a, 38b, on the lower rail 29 with a corresponding number of lamps and light-interceptors, there being a suitable number of light-interrupters 38c, 38d similarly mounted on the upper rail 30 with a corresponding number of lamps and light-interceptors. Preferably the light-interrupters have each a dome-like upper portion and serpentine slits 39 permitting light rays to pass from the lamp not only laterally but upwardly to required reflectors without materially obstructing rays of reflected light.

The light-interrupters preferably are rotated by means of electric power and accordingly each rotor has a sprocket wheel or pulley 40 suitably secured to its top, certain other rotors having also a second sprocket wheel 41 suitably secured to the first mentioned wheel, the wheels being rotatable on the center pin. A main shaft 42 is vertically arranged in proximity to the end part 4 and rotatably supported by means of journal boxes 43 and 44 secured to the bottom member 1 and the top member 3 respectively of the frame, and the shaft has small sprocket wheels or pulleys 45 and 46 secured thereto on appropriate levels. A sprocket chain or belt 47 is driven by the wheel 45 and drives the wheel 40 of the nearer one of the rotors, the wheel 41 of the rotor driving a sprocket chain 47a which drives the sprocket wheel 41 of the next adjacent rotor, the latter similarly driving the next adjacent rotor by means of a sprocket chain 47b and the sprocket wheels 40. The rotors that are mounted on the upper rail 30 are similarly driven by means of sprocket chains 47c and 47d primarily driven by the sprocket wheel 46. The shaft 42 has a suitably large beveled gear wheel 48 fixed thereto, and an electric motor 49 is supported on the bottom member 1 and has a small speed-reducing beveled pinion 50 on its drive shaft that drives the wheel 48.

A suitable number of distorting reflectors 51, 51a, 51b corresponding to the number of adjustable arms provided are suitably mounted adjustably on the arms, each reflector preferably being considerably longer horizontally then the vertical width thereof and preferably has a pivot stud 52 on the middle portion of its back whereby the reflector is frictionally held adjustably by a standard 53 which is adjustably supported on the horizontal supporting arm 51, preferably by means of a friction clip 54, so that the reflector may be variously adjusted. Each reflector has longitudinal creases or distorting configurations 55 and 56 affording various relatively angular reflecting faces, the reflecting face as a whole preferably being generally concave.

Constructed as described and arranged the reflectors and other motion simulating devices are distributed behind the various characteristic portions of the translucent parts of the front display part and may be variously adjusted as indicated in Figs. 2 and 3 as may be found desirable for most efficient action to correspond with different pictorial representations that may be required on a bill-board.

For obtaining results in harmony with the pictorial representation on the display sign, and novel simultations in various situations, a novel light-interrupter or rotor is provided, such as the rotor 38b which, as illustrated for example, is arranged opposite to that portion of the pictorial representation of an automobile that indicates whirling action of smoky or cloudy exhaust gases behind the apparently moving object, as the automobile or an airplane if represented. The rotor 38b has a cylindrical body portion or shell which may be composed of metal or of celluloid and has an opaque portion 57 of considerable width adapted to cast a relatively broad shadow when turned about the lamp upon which it is mounted by means of the shade. To lengthen the period of the shadow, the wheel or pulley on the rotor may have a greater diameter than that which drives it so that the rotor has relatively slow speed. The body of the rotor has also slots or substantially transparent portions 58 and preferably translucent portions 59 to modify the light rays passing to the reflector associated with the lamp and with the shade and the rotor. In the use of the improved light-interrupter the effect is to cause the illusion of repeated puffs of engine exhaust vapors differing in appearance from the continuous dust cloud action, so that the whole effect is singularly realistic and attractive to the observer.

Depending on the nature of the pictorial representation, the translucent panels may be variously tinted with blended colors of varying depth to produce an illusory representation of a moving object in complementary visible relation to the effects produced by the motion simulating apparatus. And it is to be understood that the rotors may if desired be rotated by other means than the electric power above described.

In practical use the front of the sign board may be illuminated by external means such as street lamps or other lamps appropriately arranged. When desired the electric lamps in the bill-board are switched into circuit and rotors are started, the light rays from the lamps being reflected onto the back of the display part, particularly so as to be effective on the translucent portions thereof. Movement of the rotors cause shadows to appear on the opposite reflectors and they are reflected together with reflections to simulate streaks on the translucent portions and also various characterizations to indicate floating clouds of vapor or dust apparently wafted in the direction opposite to that in which the pictured object apparently is moving, thus imparting to the observer the visual illusion of an object moving at high speed in comparison with the characterizations appearing on the translucent portions of the sign. Various attractive effects are obtained by various adjustments of the distorting reflectors.

What is claimed is:

1. A display sign including a front part having an opaque portion and separate horizontal translucent panels, the opaque portion bearing a representation of an object characterized for high speed, the panels representing visual effects suggestive of results of the high speed movement of the object represented, and a plurality of lamps with horizontal distorting reflectors and light-interrupters in groups arranged behind the front part.

2. A display sign having an opaque front display part and a moving object illustrated on the front face thereof, the opaque part having sight-openings adjacent to the object and translucent panels arranged in the sight-openings, and motion-simulating means arranged behind the display part co-operating to cast luminous representations of moving characters on the translucent panels suggesting relative movement in one direction of the object illustrated.

3. A display sign having a front display part and a fast-moving object illustrated on the front face thereof, portions of the display part being opaque and other separate portions translucent, the contours of the translucent portions representing animated streaks suggestive of relatively high speed of the object illustrated, and motion-simulating means arranged behind the display part in separate units and co-operating to cast luminous representations of characters on the translucent portions indicating movement of matter in the direction opposite to that of the apparent movement of the object illustrated.

4. A display sign including a front part comprising an opaque portion and separate horizontal translucent panels, the opaque portion bearing a visible representation of a fast-moving object, the panels having visual co-relation to the representation of the object and being suggestive of results of high speed forward movement of the object represented, and a plurality of co-operating series of instruments arranged behind the front part to effect simulation of movement of floating characteristic configurations on the translucent panels in complementary visual relation to the illusory effect of the panels relatively to the object represented, all being adapted to produce an illusory representation of a fast-moving object.

5. Apparatus, for simulation of a fast-moving object, having a front display part comprising opaque portions and separate relatively long horizontal translucent portions, the opaque portions bearing a pictorial representation of an object characteristically suggesting high speed in one direction, the translucent portions having contours characteristically suggestive of the relatively high speed of the object, a plurality of the translucent portions extending rearward from the rear end of the object pictorially represented, and apparatus arranged rearward of the display part comprising motion simulating devices to reflect light rays characteristically onto the back of the translucent portions in complementary relation to suggestive contours of the translucent portions to effect an illusory representation of the pictorial object at high speed.

6. A display sign including a display part comprising an opaque portion and separate streak-like translucent panels, the opaque portion bearing a representation of a characteristically high-speed vehicle moving forward relatively to the panels, the panels being characteristically indicative of relative movement of the vehicle represented, and motion simulating apparatus arranged behind the display part comprising lamps with shades and light-interrupters and also reflectors co-operating to illuminate the translucent panels with whirling configurations suggestive of effects of high speed forward movement of the vehicle represented, each reflector being concave and having longitudinal creases complementarily heightening illusory motion effect of the panels.

7. A luminous animated display sign characterized by a front display part and a pictorial representation thereon of a fast-moving object and translucent panels comprised in the display part, a plurality of the panels being visually arranged to extend separately backward from the rear end of the object represented and characteristically suggesting forward movement of the object on the display part, and illuminating motion simulating apparatus arranged behind the display part to effect illusory effects resulting from high speed of the object through space in complementary relation to the characterizating panels to produce an illustory representation of a fast-moving object.

8. A luminous animated pictorial display in simulation of a fast-moving object characterized by a front display part comprising an opaque portion and a plurality of oblong horizontal spaced apart translucent panels, the opaque portion bearing a visible representation of a characteristically high-speed object moving forward relatively to the panels, and power-driven motion simulating apparatus mounted behind the display part comprising an electric motor, a vertical shaft driven by the motor, a plurality of horizontal rails arranged on different levels, a plurality of supporting arms having arm heads adjustably secured separately to the different rails, each arm head having a lamp bulb and a shade mounted thereon, a plurality of light-interrupters rotatably mounted on the shades respectively and provided with sprocket wheels on the top thereof, sprocket chains driven by means of the vertical shaft and driving the sprocket wheels, and a plurality of oblong distorting reflectors adjustably mounted on the supporting arms respectively.

9. In a luminous animated display sign, the combination, with a front display part comprising an illustrated opaque portion and tinted translucent portions, of a plurality of distorting reflectors arranged opposite to the back of the display part, a plurality of lamp bulbs arranged intermediately of the reflectors and the display part, a plurality of lamp shades firmly supported and partially covering the bulbs respectively, a plurality of light-interrupters rotatably supported by the shades respectively and having each a drive wheel fixed thereto, an electric motor supported behind the front display part, and transmission devices connected with the motor and the drive wheels to rotate the light-interrupters in unison.

10. In a luminous animated display sign, the combination, with a front display part comprising an illustrated opaque portion and translucent portions, of a plurality of distorting reflectors arranged opposite to the back of the display part, a plurality of lamp bulbs arranged intermediately of the reflectors and the display part, a plurality of lamp shades firmly supported and partially covering the bulbs respectively, and a plurality of light-interrupters rotatably supported by the shades respectively and having relatively different portions to vary the periods of interruption of light rays passing from the lamps to the reflectors.

11. In a luminous animated display sign, the combination, with a front display part comprising an illustrated opaque portion and translucent portions, of a plurality of oblong distorting reflectors horizontally arranged behind the display part, a plurality of lamp bulbs arranged opposite to the reflectors respectively, a plurality of light-interrupters rotatably mounted on the bulbs respectively to have relatively different rotary speeds, one of the light-interrupters having definitely different opaque portions and translucent portions to variously interrupt light rays passing from the lamp to the reflector.

In testimony whereof, I affix my signature on the 1st day of October, 1931.

FRANK A. GRITT.